United States Patent
Girard

[15] 3,684,379
[45] Aug. 15, 1972

[54] INTERFEROMETRIC DEVICE

[72] Inventor: Andre J. Girard, Chatillon-sous-Bagneux, France

[73] Assignee: Office Nationale D'Etudes de Recherches Aerospatiales, Chatillon.S/.Bagneux, France

[22] Filed: July 6, 1971

[21] Appl. No.: 160,084

Related U.S. Application Data

[63] Continuation of Ser. No. 863,651, Oct. 3, 1969, abandoned.

[30] Foreign Application Priority Data

Oct. 9, 1968   France.....................68169282

[52] U.S. Cl................................356/106 S, 356/74
[51] Int. Cl............................G01j 3/00, G01b 9/02
[58] Field of Search........356/74, 106 R, 106 IS, 112; 350/163, 286

[56] References Cited

UNITED STATES PATENTS

| | | | |
|---|---|---|---|
| 3,217,591 | 11/1965 | Barr et al. | 356/112 |
| 3,409,375 | 11/1968 | Hubbard | 356/106 |
| 3,469,923 | 9/1969 | Mertz | 356/106 |

Primary Examiner—Ronald L. Wibert
Assistant Examiner—V. P. McGraw
Attorney—Karl F. Ross

[57] ABSTRACT

A composite body of radiation-transparent material, acting as an interferometer, comprises two closely juxtaposed prismatic bars of like refractive index contacting each other along a semireflecting interface which bisects a right angle between two outer bar surfaces. One of these orthogonally adjoining surfaces constitutes an entrance side for incident radiation to be split into two components at the diagonally extending interface, the other of these surfaces representing an exit side for such radiation. The throughgoing radiant component is redirected to the beam-splitting interface and thence to the exit side by a reflector at or just beyond a third prism surface parallel to the entrance side, the reflected component being returned to that interface by another reflector at or just beyond a fourth prism surface which diverges longitudinally from the exit side at a small angle whereby the path lengths of the two components differ in length by amounts varying over the length of the body. In an alternate embodiment, the beam-splitting internal surface and the reflecting surfaces are formed by structural elements separated from one another and from the entrance and exit sides by empty spaces, i.e. air gaps or evacuated zones, with a refractive index $n = 1$.

12 Claims, 26 Drawing Figures

PATENTED AUG 15 1972 3,684,379

ANDRÉ, JEAN GIRARD
INVENTOR

Karl G. Ross
ATTORNEY

PATENTED AUG 15 1972

ANDRE, JEAN GIRARD
INVENTOR

BY Karl F. Ross
ATTORNEY

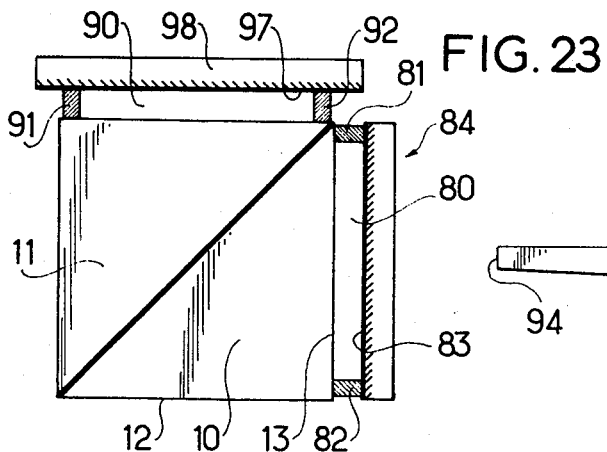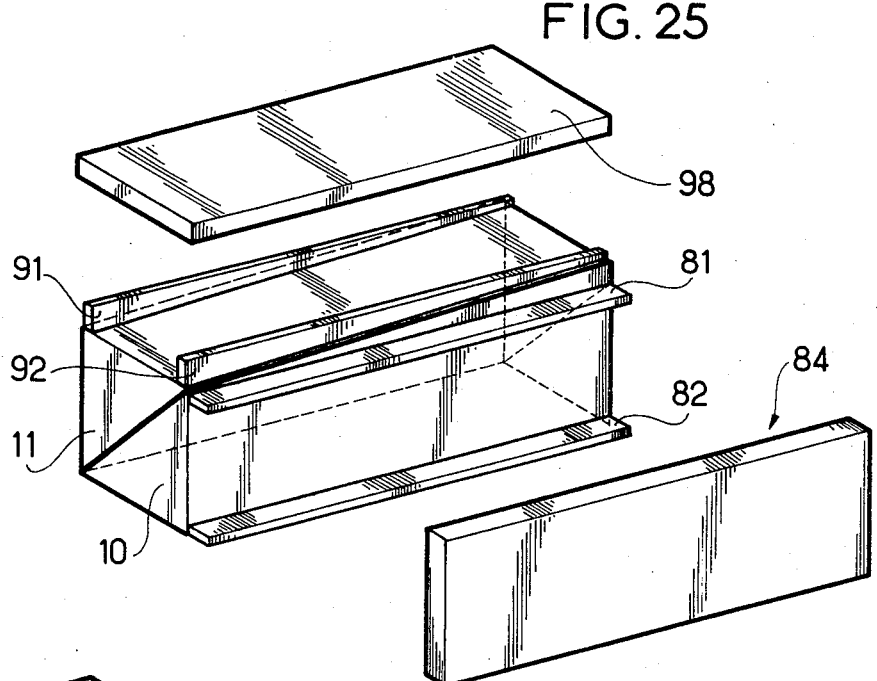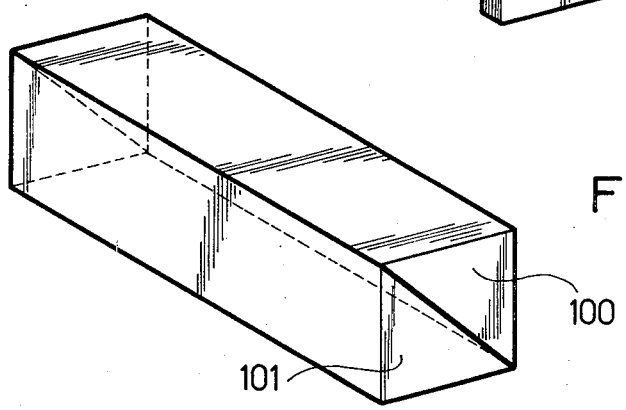

INTERFEROMETRIC DEVICE

This is a continuation of application Ser. No. 863,651, filed Oct. 3, 1969 now abandoned.

My present invention relates to interferential spectrometry.

It has already been suggested to use, for a Fourier-transform or multiplex spectrometric method, an interferometric device of the same type as the well-known Michelson interferometer, including a beam splitter irradiated by parallel rays of a beam of radiant energy to be analyzed; the radiantenergies of the outgoing beam are frequency-coded according to their wavelengths by a parallel translational displacement of one of the perpendicular mirrors of the interferometer, and the signal supplied by a receiver for the outgoing beam of the interferometric device is analyzed by a computer.

It is very difficult to carry into effect such a moving-mirror assembly (sometimes called a variable-arm-length interferometer), owing to the high precision required in the motion, which calls for comparatively heavy and bulky equipment.

The general object of my invention is to provide a spectrometric instrument of low weight and bulkiness allowing, within its field of utilization, a spectrometric analysis at least as good as those of the known interferometric instruments.

In particular, it is an object of the invention to provide a spectrometric instrument which may easily be carried, especially which may be taken aboard an aircraft or space craft.

Another object of the invention is to provide a spectrometric instrument particularly well suited for the analysis of radiation issuing from a source with a very small, practically zero, apparent diameter, such as a star.

In this connection it is a special object of the invention to provide an instrument well suited for the analysis of infrared stellar radiation.

The instrument according to the invention is distinguished by the fact that the frequency-coding, instead of being accomplished by displacement of one of the mirrors of the interferometer, is realized by a progressive change in the static conditions of interference depending upon the location of the point of incidence of the incoming radiation upon the interferometer in different planes transverse to the mirrors.

According to the invention, the planes respectively defined by the two mirrors of the interferometric apparatus are perpendicular to each other, as in the Michelson interferometer, but one of these planes is slightly tilted with respect to the intersection of the planes respectively defined by the other mirror and by the beam-splitting surface; thus the various cross-sections perpendicular to that intersection allocate paths of different length to the interfering components of the radiation to be analyzed.

The sweeping of the various cross-sections is accomplished by a relative displacement between the beam to be analyzed and the interferometric device; this sweeping may be achieved by a displacement of the whole interferometric device with respect to the beam, which is then stationary.

A spectrometric instrument according to the invention is particularly well suited for the analysis of a convergent beam, the interferometric device being located at the apex zone of the beam.

For the analysis of the radiation from a star or a planet, the beam entering the interferometric device is supplied by an astronomical reflector or telescope.

The interferometric device according to the invention may include, like the conventional Michelson interferometer, a beam-splitting plate separated from both mirrors by air (or another gas) or by vacuum.

Nevertheless, the invention may also be embodied in an interferometric device wherein the propagating medium between the beam-splitting surface and each of the mirrors is solid.

An interferometric instrument according to the invention then includes, on both sides of a surface acting as a beam splitter, juxtaposed prismatic bars with reflecting lateral faces conforming to the arrangement of the Michelson interferometer, the beam-splitting surface being then constituted by two superposed bar slides.

A composite body or block of the general type described, with juxtaposed bars forming a semireflecting internal surface and reflecting outer surfaces all converging toward a common longitudinal edge of the body, may also be given a constant cross-section for use an an interferometer in a manner analogous to that of the conventional Michelson interferometer.

The interferometric device according to my invention may also be used in a spectrometric instrument including means to analyze strongly convergent beams.

The invention will be more fully understood from the following description given by way of example with reference to the appended drawing in which:

FIG. 23 is end view of a modified interferometric device analogous to that shown in FIGS. 17 to 22;

FIG. 24 is a separate view of a constituent element of the interferometric device of FIG. 23;

FIG. 25 is an exploded perspective view of this device; and

FIG. 26 is a perspective view of a fringe-forming device according to the invention.

Figure 3:
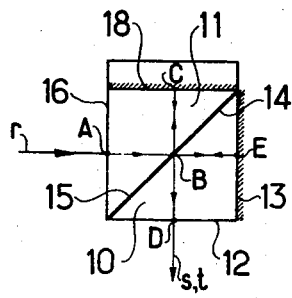
FIG. 3 is a face view thereof as seen from one end, showing certain ray paths.
Figure 2:
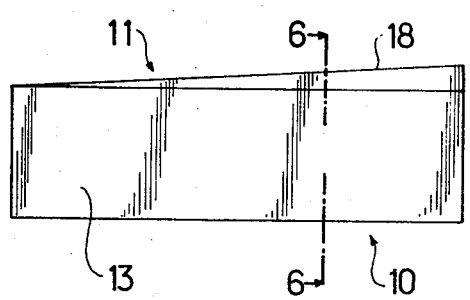
FIG. 2 is a lateral elevation of the same.

I shall first refer to FIGS. 1 to 11 relating to an interferometric device according to the invention. This interferometer includes a first prismatic bar 10 and a second prismatic bar 11. Bar 10, made of a transparent material, has a right-angled isosceles triangular cross-section and is bounded by two orthogonal sides, i.e., a lower side 12 and a vertical side 13, and by a hypotenuse side 14 tilted by 45° with respect to sides 12 and 13. One of the orthogonal sides of the bar, i.e., side 13, is reflecting, the other side 12 being transparent.

The second prismatic bar 11, made of the same transparent material as bar 10, has a hypotenuse side 15 superposed upon and joined to side 14 of bar 10. Either or both sides 14 and 15 are treated so that together they act as a beam-splitter, for example by depositing a very thin layer of germanium thereon. Another side 16 of bar 11, adjoining the hypotenuse side 15 along an edge 17, includes an angle of 45° with this side and thus is parallel to side 13 when the two bars are juxtaposed.

Side 16 adjoins an upper side 18, which is reflecting. At one end of the bar, an edge 19 of this side, perpendicular to the transverse edge 20 of side 16, is separated from the opposite end 21 of edge 20 by a distance equal to the length of an edge 22 which is the intersection of side 13 of bar 10 with its end face 23. At the other end of bar 11, side 18 is bounded by an edge 24; this edge is parallel to edge 19 but its extremity 25, i.e. its point of intersection with the vertical side 16, is separated from edge 17 by a distance greater than the length of edge 20. Thus the cross-sections of bar 11 parallel to the front face 33, which is flush with the front face 23 of bar 10, are all quadrangular, i.e., trapezoidal, the face 33 itself being triangular. Bar 11 thus has a facet 27 opposite side 16 and parallel to it; facet 27 is triangle-shaped and is bounded by an edge 28 at its intersection with side 18, an edge 31 which is in line with edge 32 of bar 10 when the two bars are juxtaposed, and an edge 29 at its intersection with the hypotenuse side 15; this last edge registers with an edge 30 of bar 10 which bounds the hypotenuse side 14 of this bar.

When a light ray (this term includes infrared and ultraviolet as well as visible light) $r$ enters block 11 through side 16 (the entrance side), perpendicularly to this side and in the plane of the end face 33 (FIG. 3), it first follows a path AB in that block up to the beam-splitting interface 14–15; at B this ray is, on the one hand, partially reflected by the splitter along a line BC and, on the other hand, traverses this semireflector along a line BE. Ray BC is returned by the reflecting side 18 as a ray CB which goes through the beam splitter and yields an outgoing ray $s$. Ray BE, which has passed through the splitter, is returned by the reflecting surface 13 as a ray EB, which is partly reflected by the interface 14–15 as an outgoing ray $t$.

The path followed, starting from and returning to the beam splitter, is in the first circuit:

$$BC + CB$$

The path followed in the second circuit is:

$$BE + EB$$

The right-angled triangles defined by faces 33 and 23 being equal, those two circuits are of equal length. Accordingly, the path difference between rays $s$ and $t$ at the exit is zero, the refractive indices of bars 10 and 11 being equal.

At the opposite end face (FIG. 7), a ray $r_1$ entering side 16 at the same distance from base 12, and partly reflected by the interface 14–15, follows in block 11 a path $B_1C_1B_1$ exceeding the path $B_1E_1B_1$ in block 10 by twice the distance $C'_1C_1$, $C'_1$ being the point where line $B_1C_1$ intersects the plane passing through edge 19 parallel to side 12. Thus, the difference between the path lengths of the components $s_1$, $t_1$ of this ray $r_1$ is equal to $2C'_1C_1$.

For an intermediate section of the interferometric device, the ray component reflected by the beam splitter returns to it over a path exceeding, by a distance smaller than $2C'_1C_1$, the path beyond and back to the beam splitter followed by the throughgoing ray component; the path difference between the outgoing rays corresponding to the reflected and throughgoing components is smaller than that for the remote end face.

The interferometric device according to the invention thus provides a path difference between two distinct ray components which varies according to the location of its point of impingement along the major dimension of the composite block, being proportional to the distance between that point and an end face of the device. When the cross-sections of an interferometric device according to the invention are successively made operative, on one a result analogous to that yielded by a Michelson spectrometer when one of the mirrors of the latter is displaced in a direction parallel to itself.

Figure 4:
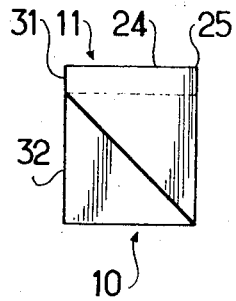
FIG. 4 is a face view as seen from the other end.
Figure 7:
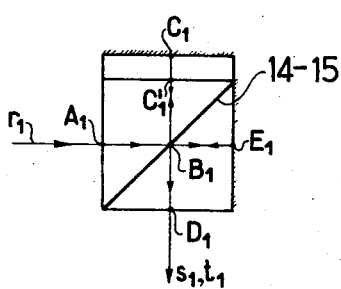
FIG. 7 is a view analogous to FIG. 3 but showing different ray paths.
Figure 1:
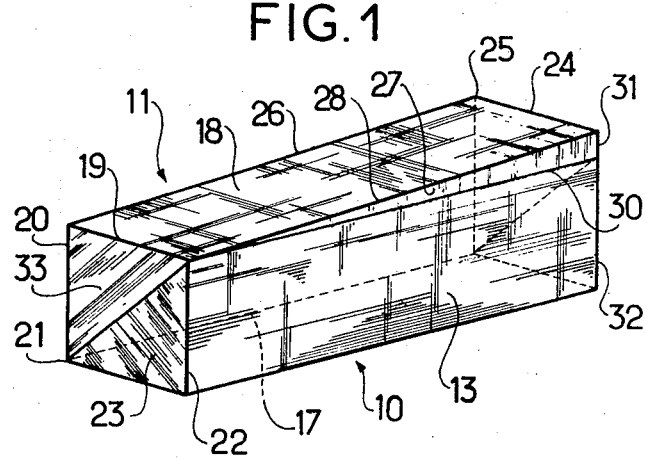
FIG. 1 is a perspective view of an interferometric device according to the invention.
Figure 6:
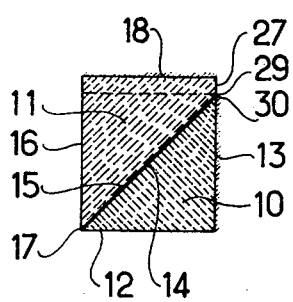
FIG. 6 is a cross-section along the line 6—6 of FIG. 2.
Figure 5:
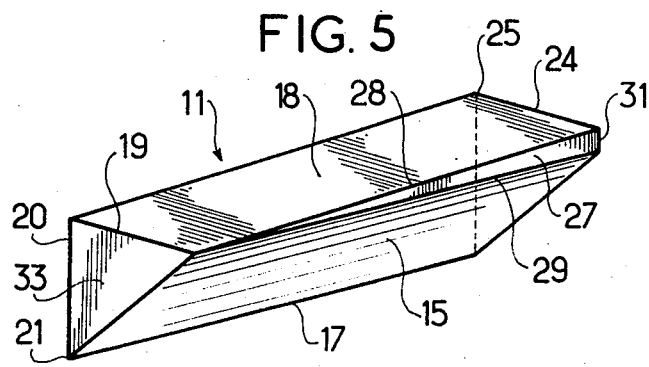
FIG. 5 is a perspective view of a bar forming part of the apparatus according to FIG. 1.
Figure 8:
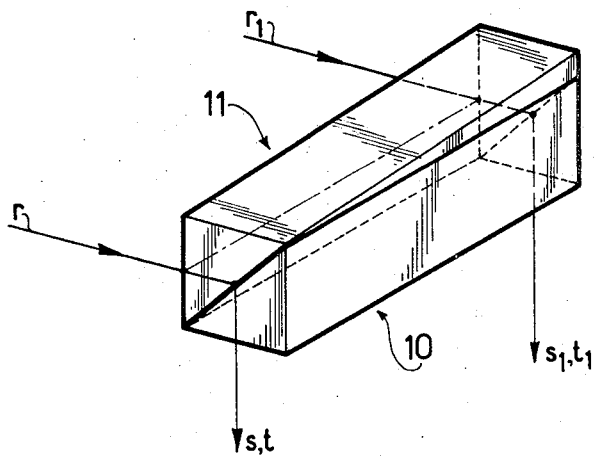
FIG. 8 is a diagrammatic perspective view analogous to FIG. 1 but showing the ray paths of FIGS. 3 and 7.

However, while in the Michelson interferometer with movable mirror the displacement must be of the same order of magnitude as the path difference to be obtained (half of this path difference if the medium interposed between the separator and the mirror is a vacuum), which necessitates an extreme precision in the realization of this motion of very small amplitude, the same result may be obtained with the interferometric device according to the invention by a difference in level, equal to the amplitude of the aforesaid motion, between the two opposite edges 24 and 19 of the reflecting side 18, if the operative range extends from the large end face visible in FIG. 4 to the small end face 23, 33. The distance between these two end faces may easily be made quite large.

A spectrometric instrument according to the invention includes an interferometric device 9 made up of the two interconnected bars 10 and 11, as just described, and means for successively passing a beam of radiation to be analyzed through the various cross-section of the device, the outgoing beam being focused on a receiver and the resulting signal being processed by a computer.

The radiation to be analyzed is contained in a beam $f_e$ whose axis is perpendicular to the entrance side 16, focusing on mirror 13 for the part going through the interface 14–15, and on mirror 18 for the part reflected by that interface. This beam is for instance supplied by an astronomical reflector or telescope aimed at a star as indicated diagrammatically at R in FIG. 9. The interferometric device 9 is displaced with a translation motion parallel to the direction of the longitudinal edges of the prismatic bars, with an amplitude large enough for the radiation beam to sweep across the entrance side 16 from one end of the other. The radiation issuing from the exit side 12 of the device is focused by a collimator 40 on a receiver 41, for example a bolometer in the case of infrared radiation, and the resulting signal is processed by a computer not shown. The collimator and the receiver are stationary, to say they do not take part in the translation motion of the interferometric apparatus.

Figure 19:
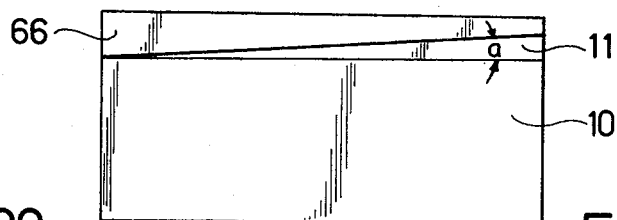
FIG. 19 is a lateral elevation of the last-mentioned interferometric device.
Figure 20:
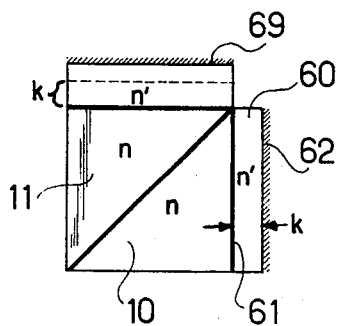
FIG. 20 is an end view of this device.
Figure 21:
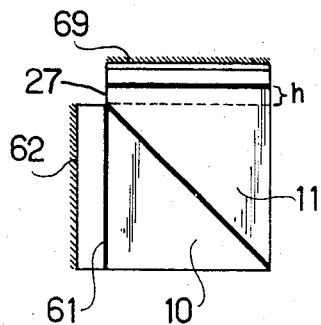
FIG. 21 is a view thereof from the other end.
Figure 22:
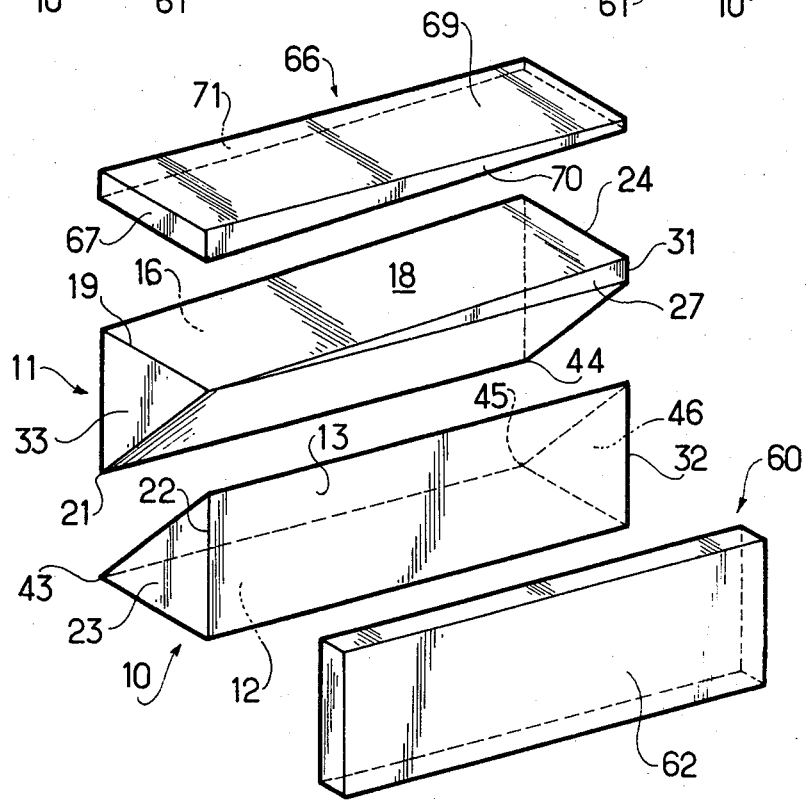
FIG. 22 is an exploded perspective view of the interferometric device of FIGS. 17 to 21.

If $x$ is the length of the translation stroke, the path difference $d$ given by the interferometric device according to the invention, with the reflecting side 18 inclined by a small angle $a$ (see FIGS. 13 and 19) with reference to exit surface 12, is for the aforesaid translation equal to:

$d = 2nxa$, $n$ being the refractive index of the material making up the bars.

If L is the length of the two constituent bars of the composite block 9, a translation by the whole length of the bar gives a path difference D equal to $2nLa$.

For the analysis of radiation in the infrared range (wavelengths between 1 and about 50–100$\mu$), an interferometric device with the following characteristics has been built to the following specifications:

| | |
|---|---|
| Length of the device | |
| 80 mm | |
| Height of the small end face | |
| 18 mm | |
| Width | |
| 18 mm | |
| Tilting angle $a$ of the inclined mirror 10' | (sexagesimal) |
| Constituent material of the prismatic bars | dense flint |
| Refractive index | 1.609 |
| Weight | about 100 g |

When this device is used, a displacement of the apparatus along its whole length enables one to obtain a path difference of the same order as that given by a Michelson interferometer when the moving mirror of the latter is displaced in a direction parallel to itself by a distance of the order of 0.1 mm, as usual. Whereas in the known interferometer the precision of motion must be to $0.1\mu$, with the interferometer according to the invention the precision in the translation giving equivalent result is of the order of 0.1 mm, which is easy to accomplish.

The receiving power of a spectrometer including the interferometric device according to the invention is proportional to the amplitude of the translation, hence to the length of the constituent bars of the composite body. In the infrared range a resolving power of the order of 100 is obtained without difficulty.

The beam width, in the sense of geometrical optics, allowed by the interferometric device according to the invention is greater than that of telescopes of normal astronomical quality. Therefore this device may advantageously be associated with such a telescope and make use of its qualities.

The comparatively large beam width allowed by my improved interferometer ensures a satisfactory spectrometric analysis notwithstanding shifts in the point of the telescope which may occur, and the interferometric device and the telescope together may be taken aboard an aircraft or space craft with a view to spectrometric analysis of stellar radiation.

Figure 12:
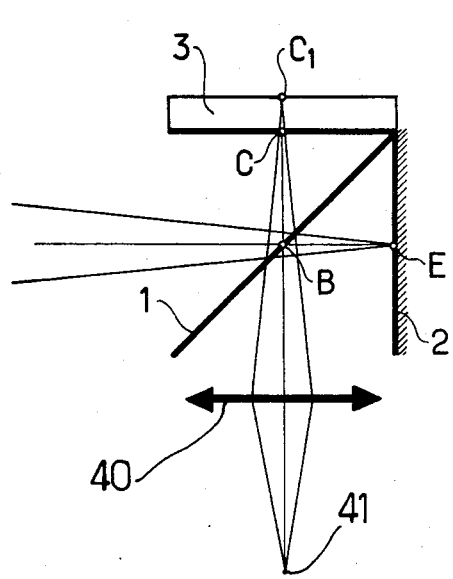
FIG. 12 is a view analogous to FIG. 9 for a different embodiment.
Figure 13:
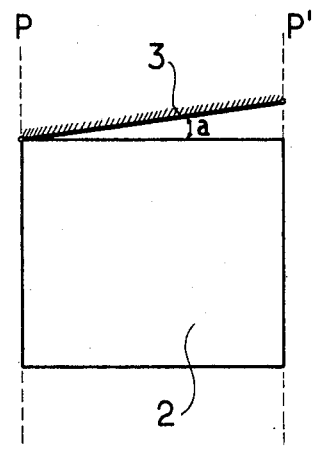
FIG. 13 is a corresponding lateral elevation.
Figure 14:
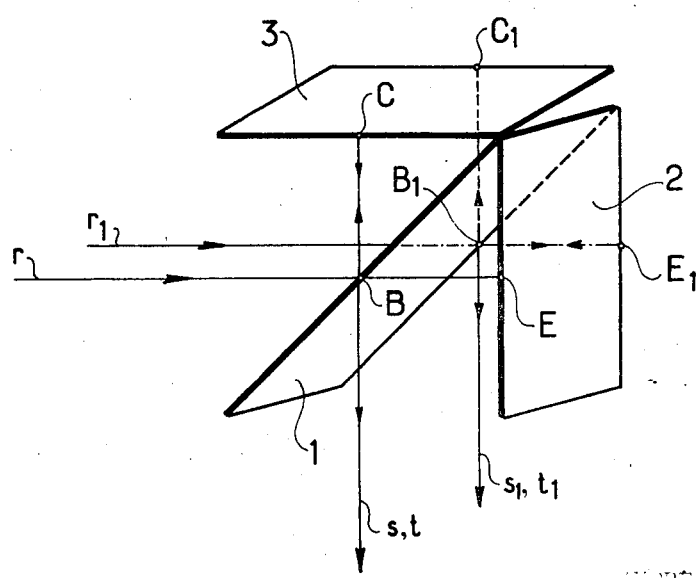
FIG. 14 is a perspective view analogous to FIG. 12 but using the interferometric device shown in FIGS. 12 and 13.

I shall now refer to FIGS. 12 to 14, relating to a variant. The beam splitter is here constituted by a semireflecting plate 1 as habitually used in a conventional Michelson interferometer. The reflecting surface of mirrors 2 and 3 is in contact with a gas or with vacuum, again as in the Michelson interferometer.

Mirror 2 includes an angle of 45° with the beam-splitting plate 1. Mirror 3, instead of passing through the line of inter-section of plate 1 and mirror 2, is tilted with respect to a plane passing through that intersection at right angles to mirror 2, which would be the plane of the second mirror in the conventional Michelson interferometer.

The device consisting of mirrors 2 and 3 and of the beam-splitter 1 is displaced with a uniform translation motion, in a direction parallel to the intersection of surfaces 1 and 2, so that the radiation flux is successively processed by the cross-sections of the device included between end planes P and P'. The outgoing radiation is focused by a collimator 40 on a photoelectric cell or equivalent transducer 41, which supplies a signal of the same type as that given by a Michelson interferometer whose mirror perpendicular to mirror 2 is displaced in a direction parallel to itself.

Figure 15:
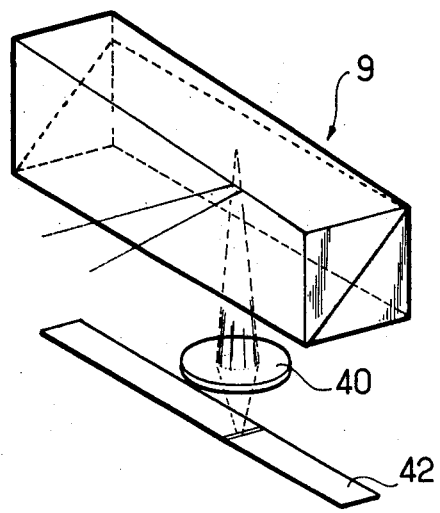
FIG. 15 is a diagrammatic perspective view of a modified spectrometric instrument according to the invention.
Figure 16:
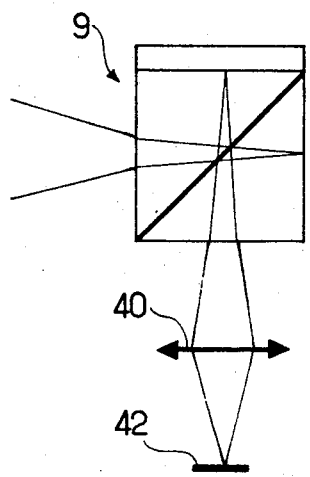
FIG. 16 is a diagrammatic end view of the interferometric device of FIG. 15.
Figure 17:
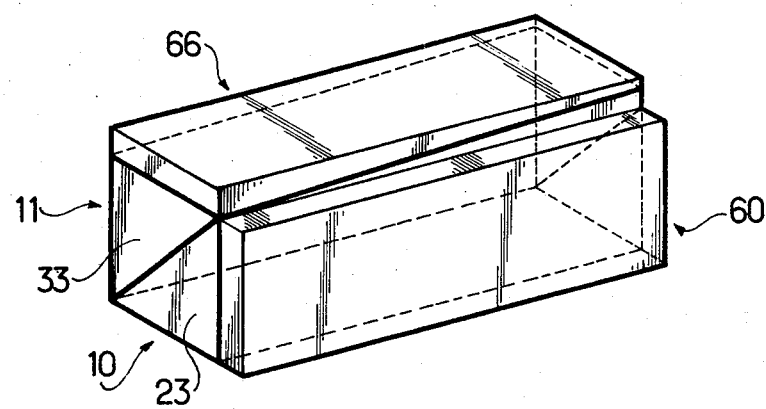
FIG. 17 is a perspective view of another modified interferometric device according to the invention.
Figure 18:
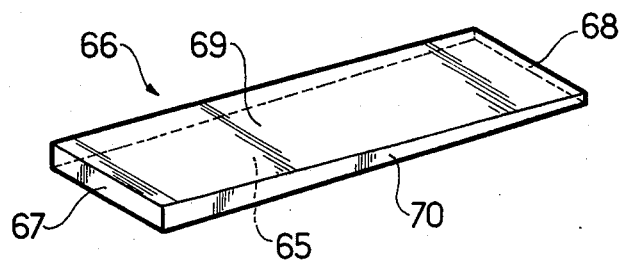
FIG. 18 is a perspective view of a separate element of the interferometric device of FIG. 17.

In a further modification illustrated in FIGS. 15 and 16, the transducer 41 in the image plane of collimator 40 is replaced by a sensitive surface 42 of a length at least equal to that of the interferometric device 9 and moving with it. One thus obtains a photographic record of the Fourier transform of the radiation flux. After the photographic processing, the sensitive surface is analyzed with a microsensitometer; the curves or the optical density values given by the microsensitometer are then, if necessary, evaluated by a digital or analog computer.

The invention can also be embodied in a system wherein the interferometric device is fixed and wherein the beam of radiation to be analyzed sweeps across the entrance side. The collimator and the radiation receiver (or the sensitive surface) then take part in the sweeping motion.

The interferometer according to my invention could also be designed as a composite body with different path lengths at an intermediate cross-section but not at the ends.

FIGS. 17 to 22 relate to another embodiment of the invention, which may be used in a spectrometric instrument. In this mode of realization, the interferometric device consists, as in the embodiment of FIGS. 1 to 11, of a first bar 10 constituted by a prism with a right-angled triangular cross-section and of a second bar 11 which may be considered a prism with an overlying wedge; at one end of this latter bar, the edge 19 of side 33 is separated from the opposite corner 21 by a distance equal to the distance between the edge 22 of side 23 and the opposite corner 43, while at the other end the edge 24 is separated from the opposite corner 44 by a distance larger than the distance between side 32 and the opposite corner 45 at the face 46 of bar 10; thus the side 18 of bar 10, bounded by edges 19 and 24, is tilted with respect to the side 12 of the bar 10 when bars 10 and 11 are joined by their hypotenuse sides.

According to this mode of realization, a plane-parallel plate 60 is joined, by its side 61, to side 13 (in this case non-reflecting) of bar 10; the exposed side 62 of this plate opposite side 61 is reflecting; the height of side 61 is equal to that of side 13, and the length of the plate 60 is equal to that of bar 10. Plate 60 is made of a transparent material of index $n'$ different from the index $n$ of the constituent material of bar 10.

A wedge-shaped plate 66 is joined, by its side 65, to the (non-reflecting) side 18 of bar 11; the side 70 of this plate is aligned with facet 27 and the side 71 thereof forms an extension of side 16; plate 66, made of the same material as plate 60, has a forward end face 67 aligned with face 33 and having a height equal to the thickness of plate 60; its opposite face 68 has a reduced height such that the image of its reflecting outer surface 69, as cast across the semireflecting interface of blocks 10 and 11, coincides with side 62 of plate 60. Consequently the composite block 10, 11, 60, 66 fulfills the condition defined by P. Bouchareine and P. Connes in 24 J. Phys. Rad. 134 (1963).

Figure 9:
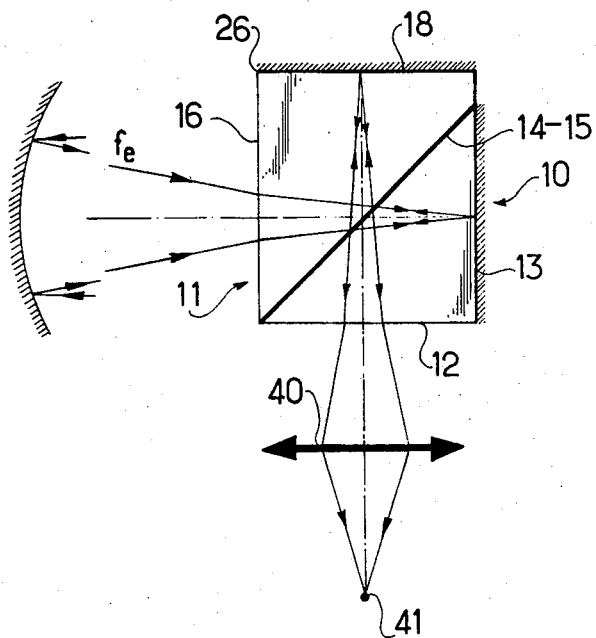
FIG. 9 is a cross-section diagrammatically showing the device of FIGS. 1 to 8 as utilized in a spectrometric instrument.
Figure 10:
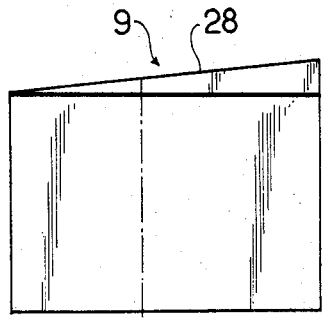
FIG. 10 is a corresponding lateral elevation.
Figure 11:
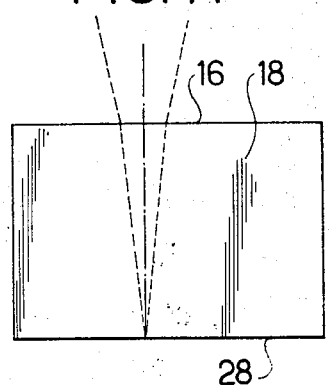
FIG. 11 is a corresponding plan view.

If the material of the prismatic bars 10, 11 is of index $n$, the material of the plates 60, 66 is of index $n'$, and the ray paths in the planes of the two end faces of the tapering plate 66 differ by a value D, we can find the length $h$ of edge 31, i.e., the difference between the heights of the end faces of the two juxtaposed bars, and the difference $k$ between the thicknesses of the wedge-shaped plate 66 at its ends 67 and 68, through the following two equations:

$$nh - n'k = D/2$$

$$n'h - nk = 0 \text{ or } h/k = n/n'$$

whence, with $n = 1.609$
$n' = 1.507$
$D = 0.16$ mm,
we obtain:
$h = 0.460$ mm
$k = 0.380$ mm The interferometric device according to this mode of realization operates independently of the aperture angle of the incoming beam which may thus be strongly convergent. This device, in association with a telescope or astronomical reflector, can therefore make full use of the radiant energy focused upon it as shown in FIG. 9.

Associated with a telescope of diameter 120 cm, which gives a flux of the order of $2.5 \cdot 10^{-11}W$ for the range of wavelengths under consideration, it enables detection of an energy quantum as small as $7.5 \cdot 10^{-14}W$.

Moreover, variations of incidence of the incoming beam do not affect the spectrographic analysis, so that a spectrometric instrument fitted with an interferometer according to this mode of realization functions well despite any shifts in the relative beam orientation which may occur when the instrument is taken aboard an air or space capsule.

In FIGS. 23 to 25, I have illustrated a modification of the embodiment just described. This device again includes, as in the mode of realization described with reference to FIGS. 1 to 8, a first prismatic bar 10 and a second prismatic bar 11, their sides 13 and 18 being now non-reflecting. Bar 10 adjoins a flat zone 80 of different reflectivity in the form of an air volume bounded by two strips 81 and 82 placed between side 13 and a side 83 of a glass plate 84. Side 83 is reflecting. Strips 81 and 82 are parallelepipedal rods of uniform thickness along their whole length. Zone 80 is thus of plane-parallel shape.

Juxtaposed with bar 11 is a generally similar zone 90 which is an air volume of a thickness decreasing from the smaller front face to the larger rear face of that bar, as with plate 66 of the preceding mode of realization. Space 90 is bounded by prismatic strips or wedges 91 and 92; each of them, as shown for strip 91, has a front end 93 taller than its rear end 94, the difference between their heights being chosen so that the image of a reflecting side 97 of an adjoining glass plate 98 (as cast through the semireflecting interface of bars 10, 11) coincides with side 83. The lower and upper strip surfaces 95, 96 are plane. Glass plate 98 rests by its reflecting undersurface 97 (see FIG. 23) on strips 91, 92. Actually this mode of realization represents a special case of the embodiment shown in FIGS. 17 to 22, i.e. a case for which the material of index $n'$ is air with $n' = 1$.

Interferometric devices of the type described above, in particular that shown in FIGS. 1 to 8, may be used to form interference fringes.

If a beam of parallel monochromatic light rays falls on the entire entrance side 12 of the stationary block 10, 11, equidistant rectilinear interference fringes are shown in the outgoing beam and may be detected by a sensitive surface disposed parallel to the exit side.

The interfringe separation $i$ for the wavelength $\lambda$ is then given by the formula:

$$i = 1/2an = \lambda/D.$$

FIG. 26 shows an interferometric device composed of two frustopyramidal bars 100 and 101, of the same transparent material, which have an isosceles right-angled triangular cross-section throughout their whole length and are joined by their hypotenuse sides to form a beam splitter. Such a composite body may be used as a Michelson interferometer.

I claim:

1. An interferometric device comprising a composite block constituted by two closely juxtaposed bars of transparent material of like index of refractivity contacting each other along a common internal surface and forming a semireflecting interface at said surface, said block having a longitudinal edge at a junction of said internal surface with two orthogonally adjoining outer surfaces, said internal surface bisecting the right angle included between said outer surfaces, one of said orthogonally adjoining surfaces being part of one of said bars and constituting an entrance side for incident rays split at said interface into two radiant components, the other of said orthogonally adjoining surfaces being part of the other of said bars and constituting an exit side for such radiation, said other of said bars forming a third outer surface of said block parallel to said entrance side, said one of said bars forming a fourth outer surface of said block generally parallel to said exit side, said block being further provided with first and second reflecting means adjacent said third and fourth surfaces, respectively, for redirecting said two radiant components to said interface and thence to said exit side over path lengths changing along the length of said block.

2. An interferometric device as defined in claim 1 wherein said fourth outer surface longitudinally diverges from said exit side at a small angle.

3. An interferometric device as defined in claim 2 wherein said block has a square smaller end diagonally bisected by said interface.

4. An interferometric device as defined in claim 3 wherein said reflecting means are directly disposed on said third and fourth surfaces.

5. An interferometric device as defined in claim 3 wherein said first and second reflecting means are mirror surfaces separated from said third and fourth surfaces by narrow first and second zones, respectively, of like refractive index different from that of said bars, the width of said second zone equaling that of said first zone at said smaller end and decreasing toward the opposite end of said block at a rate maintaining coincidence between the mirror surface of said third reflecting means and the image of the mirror surface of said second reflecting means cast upon said first reflecting means by way of said interface.

6. An interferometric device as defined in claim 5 wherein said first and second zones are formed by a plane-parallel and a wedge-shaped transparent plate, respectively, provided with said first and second reflecting means on their exposed surfaces.

7. An interferometric device as defined in claim 5 wherein said first and second zones are formed by empty spaces of plane-parallel and wedge-shaped configurations, respectively.

8. An interferometric device comprising a generally prismatic structure with an entrance side for incident radiation, an exit side for such radiation orthogonally adjoining said entrance side, a semireflecting surface extending diagonally inwardly from the junction of said entrance and exit sides while bisecting the right angle therebetween, a first reflecting surface parallel to said entrance side beyond said semireflecting surface, and a second reflecting surface separated by said semireflecting surface from said exit side and diverging from the latter at a small angle from one end to another end of the structure whereby a first component of said incident radiation, traversing said semireflecting surface, is redirected onto same and thence to said exit side by said first reflecting surface while a second component thereof, reflected at said semireflecting surface, is returned thereto by said second reflecting means for transmission to said exit side, the path lengths of said components differing by amounts varying progressively with the distance of their points of incidence from either of said ends.

9. An interferometric device as defined in claim 8 wherein a single transverse section of said structure is a square.

10. An interferometric device as defined in claim 9 wherein said single transverse section coincides with said one end.

11. In combination, an interferometric device as defined in claim 8, a source of incident radiation confronting said entrance side, said radiation being in the form of a beam substantially focused on said reflecting surfaces, and transducer means adjacent said exit side positioned to receive said radiation, said source and said structure being relatively movable in the direction of divergence of said second reflecting surface from said exit side.

12. The combination defined in claim 11 wherein said source comprises an astronomical telescope.

* * * * *

UNITED STATES PATENT OFFICE
CERTIFICATE OF CORRECTION

Patent No. 3,684,379  Dated 12 September 1972

Inventor(s) André Jean GIRARD

It is certified that error appears in the above-identified patent and that said Letters Patent are hereby corrected as shown below:

In the Heading, for the name of the assignee (line [73] read:

-- Office Nationale D'Etudes Et De Recherches Aerospatiales --.

Signed and sealed this 8th day of May 1973.

(SEAL)
Attest:

EDWARD M. FLETCHER, JR.
Attesting Officer

ROBERT GOTTSCHALK
Commissioner of Patents

6515X

UNITED STATES PATENT OFFICE
CERTIFICATE OF CORRECTION (corrected)

Patent No. 3,684,379      Dated 15 August 1972

Inventor(s) André Jean GIRARD

It is certified that error appears in the above-identified patent and that said Letters Patent are hereby corrected as shown below:

The name of the assignee should read as follows:

-- Office National d'Etudes et de Recherches Aerospatiales -- .

Signed and sealed this 27th day of November 1973.

(SEAL)
Attest:

EDWARD M. FLETCHER, JR.       RENE D. TEGTMEYER
Attesting Officer      Acting Commissioner of Patents